(12) United States Patent
Deck

(10) Patent No.: US 9,871,335 B2
(45) Date of Patent: Jan. 16, 2018

(54) TERMINATION SYSTEM WITH COMMUNICATION DEVICE

(71) Applicant: Tyco Electronics Corporation, Berwyn, PA (US)

(72) Inventor: Gary Lee Deck, Bethel, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 200 days.

(21) Appl. No.: 14/499,406

(22) Filed: Sep. 29, 2014

(65) Prior Publication Data

US 2016/0094000 A1 Mar. 31, 2016

(51) Int. Cl.
*B23P 19/00* (2006.01)
*H01R 43/048* (2006.01)
(Continued)

(52) U.S. Cl.
CPC .......... *H01R 43/048* (2013.01); *G05B 15/02* (2013.01); *H02J 7/007* (2013.01); *H04L 67/12* (2013.01); *H04W 4/008* (2013.01); *Y02B 60/50* (2013.01)

(58) Field of Classification Search
CPC .. H04B 7/0691; H04W 88/085; H04W 4/008; G05B 15/02; H01R 43/048; H02J 7/007; H04L 67/12
See application file for complete search history.

(56) References Cited

U.S. PATENT DOCUMENTS 4,649,621 A * 3/1987 Dusel ............... H01R 43/28
29/564.4

5,491,887 A * 2/1996 Quinn ............... H01R 43/048
29/753

(Continued)

FOREIGN PATENT DOCUMENTS

DE 298 06 179 U1 10/1998
DE 10 2007 050176 A1 4/2009
(Continued)

OTHER PUBLICATIONS

Gungor, V. C., et al, Industrial Wireless Sensor Networks: Challenges, Design Principles, and Technical Approaches, IEEE Transactions on Industrial Electronics, pp. 4258-4265, vol. 56, No. 10, Oct. 2009.

(Continued)

*Primary Examiner* — Minh Trinh

(57) ABSTRACT

A termination system includes an applicator and a communication device mounted to the applicator. The application has a ram that is movable towards and away from a stationary anvil along a crimp stroke. The anvil receives a terminal thereon. The ram is coupled to crimp tooling that is configured to apply the terminal to a wire along the crimp stroke. The communication device includes a storage system, a wireless communication system, and a microcontroller. The storage system stores data relating to the applicator. The wireless communication system wirelessly communicates the data relating to the applicator with an external device accessed by an operator. The microcontroller controls at least one of storage of or access to the data relating to the applicator in the storage system. The microcontroller also controls wireless communication of the data relating to the applicator with the external device via the wireless communication system.

19 Claims, 8 Drawing Sheets

(51) Int. Cl.
*H04L 29/08* (2006.01)
*G05B 15/02* (2006.01)
*H02J 7/00* (2006.01)
*H04W 4/00* (2009.01)

(56) References Cited

U.S. PATENT DOCUMENTS

| | | | |
|---|---|---|---|
| 5,661,897 A * | 9/1997 | Kaneda | H01R 43/055 |
| | | | 29/33 M |
| 5,878,215 A * | 3/1999 | Kling | G06Q 20/00 |
| | | | 370/282 |
| 9,240,661 B2 * | 1/2016 | Bainbridge | H01R 43/055 |
| 2007/0079501 A1 | 4/2007 | Garner, Jr. | |
| 2007/0129822 A1 | 6/2007 | Nicholas | |
| 2012/0137486 A1 | 6/2012 | Charlton et al. | |
| 2012/0314226 A1 | 12/2012 | Kelly | |
| 2015/0296598 A1 * | 10/2015 | Haid | H05B 37/0272 |
| | | | 315/291 |
| 2016/0094000 A1 * | 3/2016 | Deck | G05B 15/02 |
| | | | 29/753 |

FOREIGN PATENT DOCUMENTS

| | | |
|---|---|---|
| WO | 2007 / 067507 A1 | 6/2007 |
| WO | 2009 / 059769 A1 | 5/2009 |

OTHER PUBLICATIONS

Siekkinen, Matti, et al, How low energy is bluetooth low energy?, Comparative Measurements with ZigBee/802.15.4, Wireless Communications and Networking Conference Workshops (WCNCW), 2012/IEEE, Apr. 1, 2012, pp. 232-237.
European Search Report, dated, Feb. 24, 2016, EP 15 18 7047, Application No. 15187047.4-1958.

* cited by examiner

TERMINATION SYSTEM WITH COMMUNICATION DEVICE

BACKGROUND OF THE INVENTION

The subject matter herein relates generally to communication devices that store data relating to an applicator of a termination system and wirelessly transfer the data to a termination machine and/or an external device to support set-up, operation, and/or maintenance of the termination system.

In a termination machine, a wire is terminated with a terminal or connector. Applicators are mounted on the termination machine to properly apply the terminal to the wire to form an electrical lead. Various applicators may be interchangeably used with the termination machine based on the characteristics and properties of the specific wire and the specific terminal. Consequently, applicator changeover may be required to produce different electrical leads.

In some termination systems, significant operator input is required to setup each applicator installed onto a termination machine. Specific settings and adjustments on the termination machine are required for each individual applicator. Critical data relating to each specific applicator, such as, terminator adjustment position for the proper crimp height, is either recorded in a file on the termination machine, and must be searched for by an operator, or recorded external to the termination machine, and must be manually input onto the termination machine by the operator. Either situation takes significant time for the operator to verify that the correct information is loaded into the termination machine for the specific applicator. For example, incorrect data loaded by the operator or other operator error may lead to tooling crashes or improperly crimped connectors. During the time the operator spends inputting and verifying the applicator-specific information, the production of the electrical leads is postponed, reducing productivity.

Some termination systems have attempted to reduce the time and errors during the changeover of applicators by installing smart tags on applicators. The smart tags store data relating to the applicator upon which the tag is mounted, such as an identifier of the type of applicator, serial number of the applicator, required operating parameters, and/or other information. In some systems, the smart tag is a bar code or an RFID tag which is scanned by an external reader device to read the information contained on the smart tag. Typically the reader device transfers the information to the termination machine via a wired electrical connection. In known termination systems that use smart tags, a wired electrical connection is used to transfer information between the smart tag on the applicator and the termination machine. The wires may get in the way in the termination system, where space is tight. In addition, plugging and unplugging wires may add more time to an applicator changeover procedure.

In addition, in some known termination systems that use smart tags, the information transferred to and from the smart tag may be in a format or protocol that requires specific software to display. The smart tag may only be able to communicate with devices that have the specific software, which is typically only the termination machine. As such, an operator must be at the termination machine to access and/or update the information contained on the smart tag.

Furthermore, some smart tags require a power source to operate, such as a wired connection to an external electrical power source or an integrated battery. Although an integrated battery may avoid the issues associated with external wires in the termination system, the battery may have a define lifetime before the battery loses charge and the smart tag (or at least the battery) must be replaced. As the operations and functionality of the smart tags increase, more power may be demanded from the battery which reduces the effective battery life, requiring more frequent replacements.

BRIEF DESCRIPTION OF THE INVENTION

In one aspect, a termination system is provided that includes an applicator and a communication device. The applicator includes a ram and an anvil. The anvil is located in a crimping zone and is configured to receive a terminal thereon. The ram is configured to be driven towards and away from the anvil along a crimp stroke. The ram includes crimp tooling that is configured to crimp the terminal to a wire as the ram moves towards the anvil. The communication device is mounted to the applicator. The communication device includes a storage system, a wireless communication system, and a microcontroller. The storage system stores data relating to the applicator. The wireless communication system wirelessly communicates the data relating to the applicator with an external device accessed by an operator. The microcontroller controls at least one of storage of or access to the data relating to the applicator in the storage system. The microcontroller also controls wireless communication of the data relating to the applicator with the external device via the wireless communication system.

Optionally, the wireless communication system communicates with the external device by establishing a communication link according to a protocol that utilizes a dedicated advertisement channel. The protocol may be a Bluetooth® low energy protocol. Optionally, the communication device further includes a sensor that monitors movement of the ram along the crimp stroke. The microcontroller is configured to update a crimp stroke count based on one or more signals received from the sensor. The microcontroller records the crimp stroke count in the storage system and/or controls the wireless communication system to communicate the crimp stroke count to the external device.

In another aspect, a termination system is provided that includes an applicator and a communication device. The application has a ram that is movable towards and away from a stationary anvil along a crimp stroke. The anvil receives a terminal thereon. The ram is coupled to crimp tooling that is configured to apply the terminal to a wire along the crimp stroke. The communication device is mounted to the applicator. The communication device includes a storage system, a microcontroller, a rechargeable battery, and a charging system. The storage system stores data relating to the applicator. The microcontroller controls at least one of storage of or access to the data relating to the applicator in the storage system. The rechargeable battery provides an electrical current to power the communication device. The charging system generates an electrical current to charge the battery based on movement of the applicator.

DETAILED DESCRIPTION OF THE INVENTION

Figure 1:
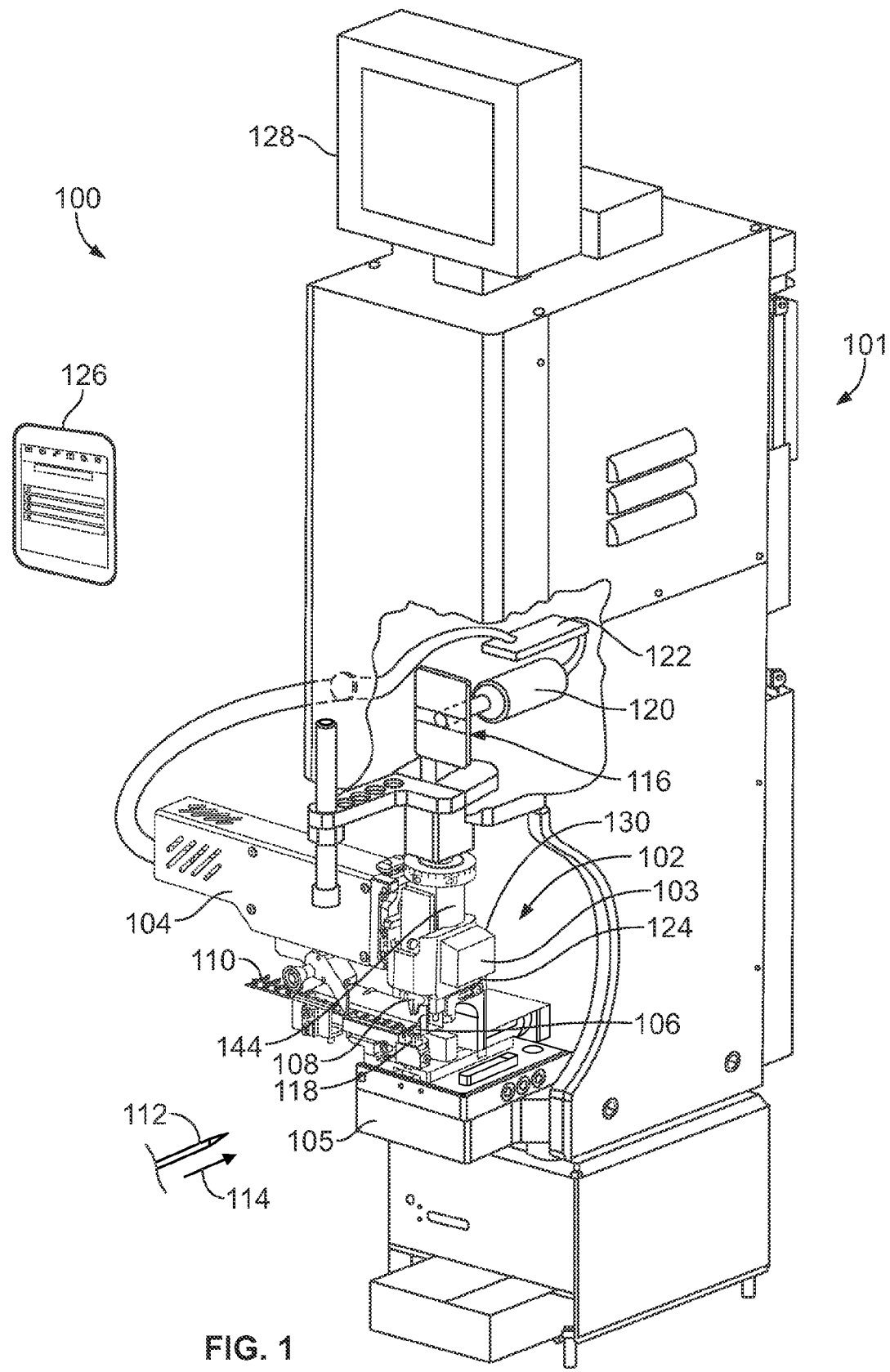
FIG. 1 illustrates a perspective view of a termination system formed in accordance with an exemplary embodiment.

Various embodiments of the subject matter described herein will be better understood when read in conjunction with the appended drawings. To the extent that the drawings illustrate diagrams of functional blocks of various components, the functional blocks are not necessarily indicative of the division between hardware and/or circuitry. Thus, for example, one or more of the functional blocks (e.g., processors, controllers, or memories) may be implemented in a single piece of hardware (for example, a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

The systems described herein can include or represent hardware and associated instructions (e.g., software stored on a tangible and non-transitory computer readable storage medium, such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein from the instructions described above. Additionally or alternatively, one or more of these devices may be hard-wired with logic circuits to perform these operations based on the hard-wired logic. The systems may represent the hardware that operates based on software or hardwired instructions, the software that directs hardware to perform the operations, or a combination thereof.

Described herein are embodiments of a termination system for terminating a wire to a connector, such as a terminal, to produce electrical leads. The termination system includes a communication device that may be used to wirelessly communicate data and other information about the termination system to external devices to allow a remote viewer to access and/or manipulate the information.

FIG. 1 illustrates a perspective view of a termination system 100 formed in accordance with an exemplary embodiment. The termination system 100 includes an applicator 102, and a communication device 103. The applicator 102 includes a ram 144 and an anvil 118. The anvil 118 is disposed or located in a defined crimping zone 106, which is the area where a connector and a wire are individually fed for each crimping operation to produce an electrical lead.

The anvil 118 is configured to receive the connector, hereafter referred to as the terminal 110, thereon. The terminal 110 may have a crimp barrel (not shown) into which an end of a wire 112 is fed. The ram 144 is movable relative to the anvil 118, which is stationary (although the position of the anvil 118 may be adjustable). The ram 144 is configured to be driven towards and away from the anvil 118 along a crimp stroke. One full crimp stroke may include both the movement of the ram 144 from an upper retracted position towards the anvil 118 as well as the movement of the ram 144 away from the anvil 118 back to the retracted position. The ram 144 may include crimp tooling 108 along a lower end of the ram 144. The crimp tooling 108 is configured to crimp the terminal 110 to the wire 112 as the ram 144 moves towards the anvil 118. For example, the crimp tooling 108 may engage the terminal 110 and crimp the terminal 110 onto the wire 112 by compressing the terminal 110 between the crimp tooling 108 and the anvil 118.

As shown in FIG. 1, the termination system 100 may include a feeder device 104, or feeder 104, that operates to feed the terminals 110 to the applicator 102 and present one terminal 110 to the crimping zone 106 for each crimping operation. The feeder 104 may be positioned adjacent to, and optionally coupled to, the applicator 102. The feeder 104 may be used with different applicators 102 by removing the feeder 104 from the applicator 102 and mounting the feeder 104 to a different applicator. The terminals 110 may be guided to the crimp zone 106 by a guide member (not shown) of the feeder 104 to ensure proper positioning of the terminals 110 within the crimping zone 106. The feeder 104 may be configured to deliver terminals 110 of multiple different sizes. The feeder 104 may also be configured to deliver either side-feed terminals or end-feed terminals. Side-feed terminals are arranged side-by-side on a carrier strip and end-feed terminals are arranged successively, end-to-end. The feeder 104 may be an electrically actuated feeder (as shown in FIG. 1), a pneumatic feeder, a cam and linkage feeder, or the like. The wires 112 are delivered to the crimping zone 106 by a wire feeder, wire transfer, swivel mechanism, or the like (not shown), or alternatively by an operator (for example if the termination machine 101 is a bench machine). The wires 112 are delivered in a wire loading direction 114. The wire loading direction 114 may be transverse to the direction that the terminals 110 are fed to the crimping zone 106.

The termination system 100 may also include a termination machine 101 onto which the applicator 102 may be removably loaded. The termination machine 101 may include a driving mechanism 116 that drives the ram 144 (and coupled crimp tooling 108) through the crimp stroke. The driving mechanism 116 drives the ram 144 initially downward towards the stationary anvil 118 and finally upward away from the anvil 118. The crimping of the terminal 110 to the wire 112 occurs during the downward component of the crimp stroke. In an exemplary embodiment, the driving mechanism 116 is driven by a crimping machine actuator 120. Optionally, the crimping machine actuator 120 may be a motor having a drive shaft that moves the driving mechanism 116. Alternatively, the crimping machine actuator 120 may be a linear actuator, a piezoelectric actuator, a pneumatic actuator, and the like. The operation of the crimping machine actuator 120 is controlled by a controller 122 of the termination machine 101. The controller 122 may also control the timing and length of the feed stroke of the feeder 104.

The termination machine 101 is illustrated as a terminal crimping machine, such as a bench machine or an automatic lead making machine, used for crimping connectors to wires. Alternatively, the termination machine 101 may be another type of crimping machine such as a lead frame machine. However, other types of machines that attach connectors to wires using processes other than crimping may be used, such as an insulation displacement connector (IDC) machine, a welding machine, and the like. The applicator 102 may be loaded onto the termination machine 101 by coupling the applicator 102 onto a platform 105 of the termination machine 101.

In an exemplary embodiment, the applicator 102 may be removably coupled to the termination machine 101 to allow for the applicator 102 to be exchanged with other types of applicators depending on the desired application. For example, the applicator 102 may be used to produce only a limited number of different electrical leads. Components of the applicator 102 may be adjusted to accommodate a limited number of different types, shapes, and sizes of terminal 110, as well as a limited number of types and sizes (for example, gauge) of wire 112. For example, the termination machine 101 may be capable of terminating around fifty different types of terminals and/or around fifteen different types of wire, while the applicator 102 accommodates only a predefined sub-set of the terminals and wire, such as five different types of terminals and/or four different types of wire. Therefore, for a different run of terminals and/or wire, the applicator 102 that is currently installed in the termination machine 101 may need to be substituted with another applicator that is configured to produce the accommodate the terminals and wire to produce the desired leads. In addition, the applicator 102 may be removed from the termination machine 101 when the applicator 102 (or a component thereof) is worn and needs to be replaced. The applicator 102 may also be replaced if another configuration of applicator is desired, such as an applicator that is designed to accommodate side-feed terminals or end-feed terminals. A side-feed type applicator 102 is illustrated in FIG. 1.

Before performing a crimping operation or a series of crimping operations, the termination system 100 generally must be set up. For example, the termination machine 101 may drive the ram 144 via the crimping machine actuator 120 and may control the feed stroke of the feeder 104. The different applicators 102 that may be interchanged within the termination machine 101 may have different set-up parameters. Depending on the terminals 110, the wire 112, and/or the installed applicator 102, the distance and timing of the crimp stroke and the feed stroke may vary. Various other crimping parameters may need to be adjusted as well, such as crimp height. Therefore, when setting up the termination system 100, the termination machine 101 must be provided with information necessary to make the proper adjustments. Once the termination system 100 is configured, the system 100 may produce a run of electrical leads without additional adjustments.

In an exemplary embodiment, the communication device 103 is mounted to the applicator 102. The communication device 103 may be configured to store data relating to the applicator 102. As used herein, data may refer to information that is in a digital and/or machine-readable format. The data relating to the applicator 102 may include an applicator identifier that identifies a name, a type, and/or a serial number of the applicator 102. The data may include set-up parameters, such as acceptable terminal types and sizes, wire types and sizes, and/or crimp heights. The set-up parameters optionally may include step-by-step set-up instructions for an operator to follow when manually configuring the termination system 100. The data may also include a maintenance schedule for the applicator 102 that suggests when the applicator 102, or components thereof, should be replaced or repaired to maintain the integrity of the termination system 100 and the quality of the produced leads. The data may further include a crimp stroke counter and/or a feed stroke counter that tracks the number of crimp strokes and/or feed strokes of the termination system 100 during use. The counter(s) may be used in conjunction with the maintenance schedule. For example, the maintenance schedule may identify a maintenance target of one or more components of the applicator 102 based on the crimp stroke count since the last time the crimp stroke counter was reset. For example, the maintenance target for the crimp tooling 108 and/or anvil 118, which both receive significant wear during crimping operations, may be a set number of crimp strokes, such as 10,000.

In an exemplary embodiment, the communication device 103 is configured to wirelessly communicate with an external device 126. For example, the communication device 103 may be configured to establish a communication link with the external device 126 in order to transmit the data relating to the applicator 102 to the external device 126. The external device 126 optionally may be a smartphone, tablet, personal computer, laptop computer, or the like. The external device 126 may be accessed by an operator of the termination system 100. The operator may use the data relating to the applicator 102 that is received at the external device 126 to, for example, set up the termination system 100 and track counts for maintenance. The communication link established between the communication device 103 and the external device 126 may be a bi-directional communication link such that the communication device 103 may also receive messages sent from the external device 126. The messages sent from the external device 126 may include adjustments to the set-up parameters or other information stored in the communication device 103. The messages may also include a command to reset the crimp stroke and/or feed stroke counters, such as after a maintenance event has occurred. As described below, the communication link may be established according to a protocol that utilizes a dedicated advertisement channel. In an embodiment, the protocol may constitute a Bluetooth® low energy protocol.

Optionally, the communication device 103 may be configured to establish a wireless communication link with the termination machine 101 directly, such that the data relating to the applicator 102 may be uploaded to the controller 122 of the termination machine 101. The communication link between the communication device 103 and the termination machine 101 may be similar to the communication link established between the communication device 103 and the external device 126. Once the termination machine 101 receives the data, the controller 122 may be configured to display the information on a display device 128 to allow an operator to view the applicator-specific information. For example, the display device 128 may display the set-up parameters for the applicator 102 in a list of step-by-step instructions for the operator to follow when configuring the termination machine 101. Alternatively, or in addition, the termination machine 101 may be configured to make automatic adjustments based on the data received from the communication device 103 without operator intervention.

The communication device 103 may be mounted to a frame 124 of the applicator 102. The frame 124 at least partially surrounds the ram 144. The ram 144 moves relative to the frame 124 along the crimp stroke. Alternatively, the communication device 103 may be mounted to another part of the applicator 102, such as to the ram 144 or to a base (not shown). The communication device 103 may be removably mounted to the applicator 102, such as by a mechanical fastener, an adhesive, or the like. The communication device 103 includes a housing 130. In an embodiment, the components of the communication device 103 are contained within and/or on the housing 130. The communication device 103 may not be electrically connected to the termination machine 101 via a wired connection. In addition, the communication device 103 may not be electrically connected to the applicator 102 via a wired connection. As such, the communication device 103 may be a self-contained, self-powered, autonomous device that communicates with the external device 126 and/or the termination machine 101 wirelessly only.

Figure 2:
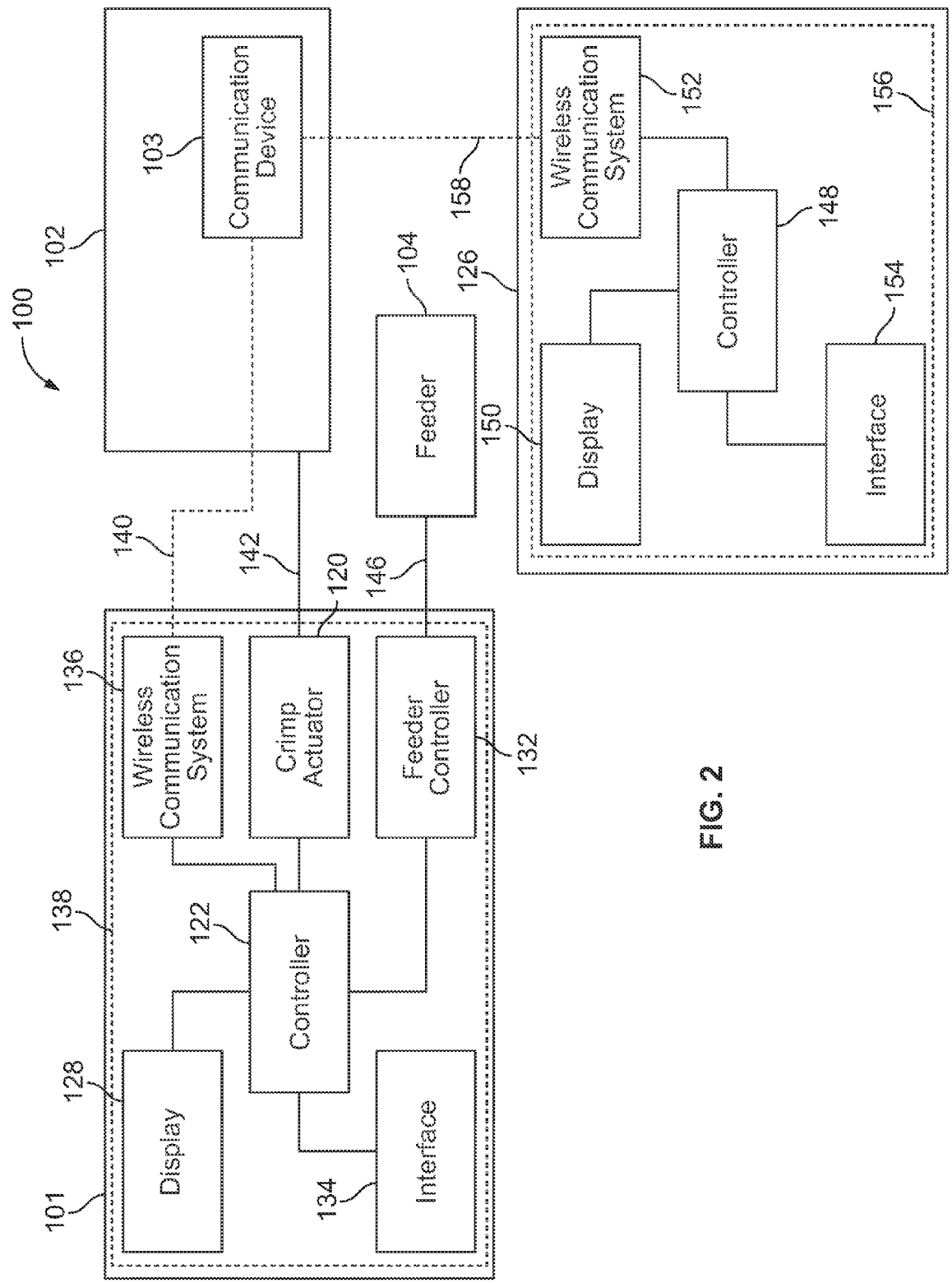
FIG. 2 is a schematic diagram of the termination system shown in FIG. 1 according to an exemplary embodiment.

FIG. 2 is a schematic diagram of the termination system 100 according to an exemplary embodiment. The termination system 100 includes the applicator 102 with the communication device 103 attached thereto. The termination system 100 in an embodiment may also include the termination machine 101 and the external device 126. The schematic diagram in FIG. 2 may show at least some components of the operating systems that operate the respective termination machine 101 and the external device 126. The termination machine 101 includes the controller 122 which functions as a main controller that controls operation of the termination machine 101. The controller 122 may include a microprocessor, or equivalent control circuitry, designed specifically for setting up and controlling the crimping operation. The controller 122 may be any suitable controller that carries out the functions described herein. The termination machine 101 also includes the crimping machine actuator 120 which drives the ram 144 (shown in FIG. 1) of the applicator 102. The termination machine 101 may further include a feeder controller 132 which controls the feeder device 104. For example, the feeder controller 132 may control the timing of the feed stroke, the speed of the guide member (not shown) that propels the terminals 110 (shown in FIG. 1), the length of the feed stroke, and/or the locations of both advanced and retracted positions of the guide member along the feed stroke. The crimp actuator 120 may be mechanically linked to the applicator 102 by a mechanical connection 142, shown by a solid line in FIG. 2. The mechanical connection 142 may be the driving mechanism 116 shown in FIG. 1. The feeder controller 132 may be mechanically and/or electrically linked to the feeder 104 via linkage 146.

In an embodiment, the termination machine 101 also includes an interface 134 and the display device 128. The interface 134 and display device 128 may be housed at least partially within the termination machine 101, as shown in FIG. 2. In an alternative embodiment, the interface 134 and the display 128 may be housed separately from the termination machine 101, such as on a computer system used in cooperation with the termination machine 101. The termination machine 101 may receive data input and commands from an operator at the interface 134. The interface 134 may be a control panel having inputs such as push buttons, touch screen inputs, switches, knobs, and the like. Alternatively, the interface 134 may be a keyboard, a mouse, a trackball, and the like. As mentioned above, the termination machine 101 may provide information to the operator via the display device 128. The display device 128 may include a monitor, video screen, an LED display, and the like. The display device 128 may include a speaker system (not shown) that produces audio. For example, the speaker system may be used to provide audio alerts and/or notifications to the operator prior to and during a crimping operation. The interface 134 and the display device 128 may be integrated with one another or may be separate components.

The termination machine 101 may also include a wireless communication system 136. The wireless communication system 136 may be configured to transmit and receive electromagnetic radiation signals in the radio frequency (RF) range. The wireless communication system 136 may be configured to communicate with the communication device 103 by establishing a wireless communication link 140 (shown by the dashed line 140 in FIG. 2). The wireless communication link 140 may use any standard wireless protocol, such as Bluetooth®, Bluetooth® low energy, wireless USB, Wi-Fi, and the like.

The main controller 122 is interconnected with the wireless communication system 136, the feeder controller 132, the interface 134, and the display device 128 via a data/address bus 138 (which is shown by the dashed line 138 in FIG. 2). The data bus 138 may be formed of circuitry and/or hard-wired connections. Information in messages transmitted wirelessly from the communication device 103 may be received by the wireless communication system 136, which may re-format the information before forwarding the information to the controller 122. The controller 122 may process the information and act, such as by controlling the display device 128 to display the information for viewing by an operator, controlling the feeder controller 132 to modify a feed stroke of the feeder 104, and/or controlling the crimping machine actuator 120 to modify a crimp stroke of the applicator 102. In an alternative embodiment, instead of communicating directly with the main controller 122, the various components of the termination machine 101 may communicate indirectly with the main controller 122 via an interconnect board (not shown).

The external device 126 may include a controller 148, a display system 150, a wireless communication system 152, and an interface 154. The external device 126 may further include an internal bus 156 that may interconnect the components above. The internal bus 156 may be an address/data bus that transfers information between the components. The controller 148 may include a processing unit, such as a microprocessor, a microcontroller, or equivalent control circuitry, designed to control operations of the external device 126. The controller 148 may also include RAM or ROM memory, logic and timing circuitry, state machine circuitry, input/output (I/O) circuitry, and the like. The display system 150 may be provided to display information of data as described herein. For example, the display system 150 may be used to present a visual representation of an output, such as a chart or table showing data relating to the applicator 102. The display system 150 may include a speaker system (not shown) that produces audio to provide, for example, audio alerts and/or notifications to the operator prior to and during a crimping operation. The interface 154 may be a control panel having inputs such as push buttons, touch screen inputs, switches, knobs, and the like. For example, the control panel may be a touchscreen that accepts a user's touch input when selections are made. The interface 154 optionally may also include one or more I/O ports, such as a USB port that is capable of communicating with a USB device such as a memory stick. The wireless communication system 152 may be configured to transmit and receive electromagnetic radiation signals in the radio frequency (RF) range. The wireless communication system 152 may be configured to communicate with the communication device 103 by establishing a wireless communication link 158 (shown by the dashed line 158 in FIG. 2). The wireless communication link 158 may use any standard wireless protocol, such as Bluetooth®, Bluetooth® low energy, wireless USB, Wi-Fi, and the like.

In an embodiment, the external device 126 may be a workstation, a desktop computer, a laptop computer, a tablet computer, a programmer, a smartphone, and the like. The external device 126 may be accessed by an operator of the termination system 100 or another user. In an embodiment, data relating to the applicator 102 may be transmitted as a wireless message from the communication device 103 to the external device 126, where the message is received by the wireless communication system 152. The wireless system 152 may forward the data that is received to the controller 148 for appropriate action. Optionally, the controller 148 may control the display system 150 to display a chart or table that includes information about the applicator 102 for viewing by the operator or user of the external device 126. Using the information, the operator may manipulate the interface 134 of the termination machine 101 such as to set-up the machine 101 for a crimping operation. In another situation, the message received by the external device 126 from the communication device 103 may include status information about the applicator 102. The status information may include a crimp stroke count, which is a number of crimp strokes of the ram 144 (shown in FIG. 1) recorded by a crimp stroke counter since the last time the crimp stroke counter was reset. The status information may also include a maintenance schedule. The maintenance schedule may identify a time or a number of crimp strokes since one or more tooling components of the applicator 102 were replaced. The schedule may also identify a time or number of crimp strokes until one or more such tooling components should be replaced according to the maintenance schedule to avoid damage or reduced lead quality caused by wear. Other uses and functions of the external device 126 are described further below.

Figure 3:
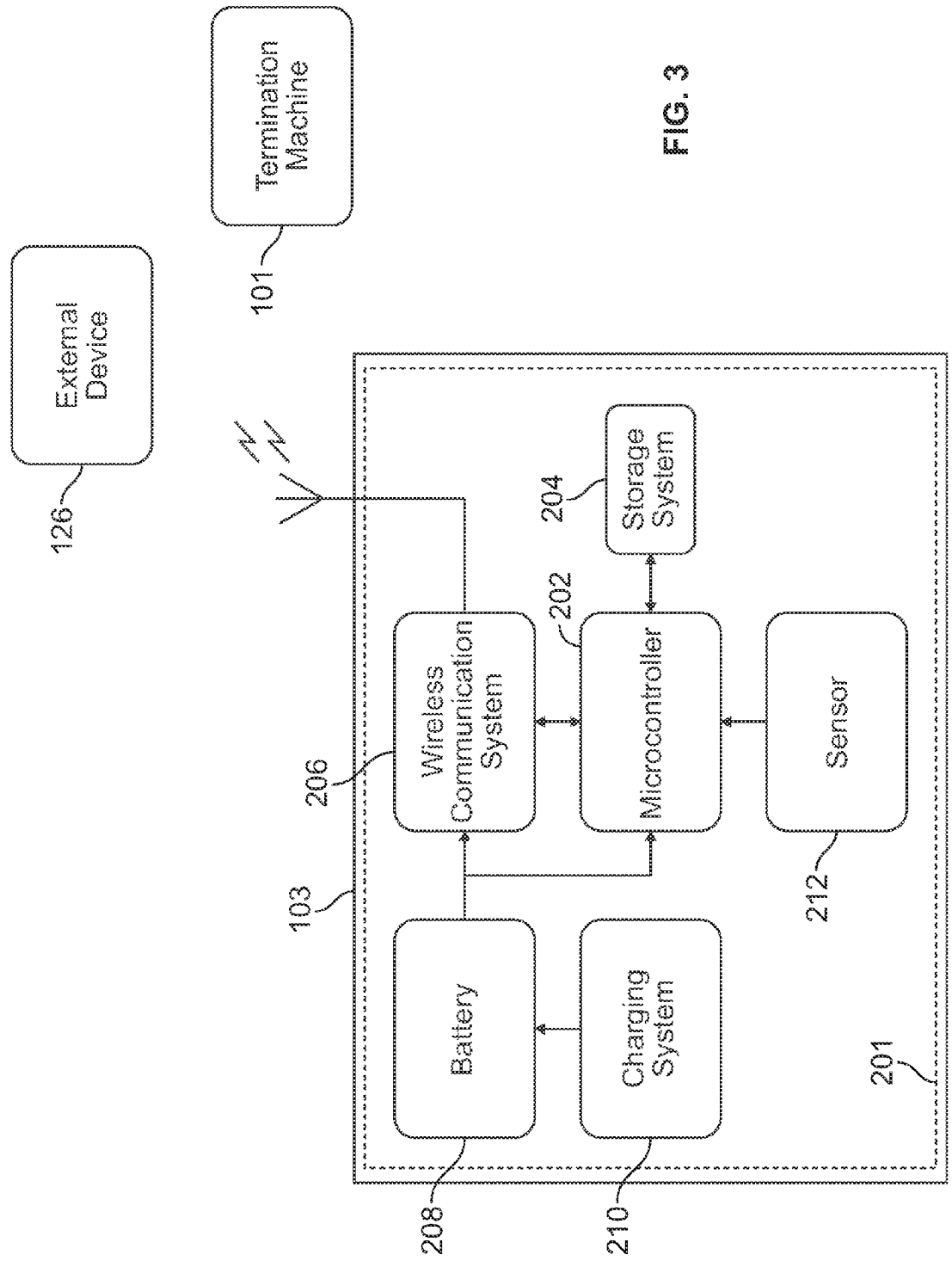
FIG. 3 is a schematic diagram of a communication device according to an exemplary embodiment.

FIG. 3 is a schematic diagram of the communication device 103 according to an exemplary embodiment. The communication device 103 may be mounted to the applicator 102 (shown in FIGS. 1 and 2). The communication device 103 may include a microcontroller 202, a storage system 204, a wireless communication system 206, a battery 208, a charging system 210, and a sensor 212. The various components of the communication device 103 may be implemented in hardware, software, of a combination thereof. The hardware may include electronic circuits that include and/or are connected to one or more logic-based devices, such as microprocessors, processors, controllers, or the like. The communication device 103 may further include an internal data bus 201 that may electrically interconnect the components above. The internal bus 201 may be an address/data bus that transfers information between the components, as indicated by the arrows shown in FIG. 3.

The storage system 204 may include one or more physical devices configured to store data relating to the applicator (for example, identification information and set-up parameters) and/or instructions executable by the microcontroller 202 to implement one or more operations described herein. The storage system 204 may include, for example, removable media and/or integrated/built-in devices. The storage system 204 may have non-volatile, read/write operating characteristics. Optionally, or alternatively, the storage system 204 may have characteristics of volatile, dynamic, static, read-only, random access, sequential access, location addressable, filed addressable, and/or content addressable. The storage system 204 may also include other devices, such as optical memory devices, semiconductor memory devices (for example, RAM, EEPROM, flash, etc.) and/or magnetic memory devices, among others.

In an exemplary embodiment, the storage system 204 is configured to store data relating to the applicator 102 (shown in FIGS. 1 and 2). The data may include an applicator identifier, set-up parameters, a crimp stroke count, a maintenance schedule, and the like. The applicator identifier may be information that identifies the applicator 102, such as applicator name, type, serial number, and the like. The set-up parameters may include information that is useful in setting up the termination machine 101 to operate using the applicator 102. The set-up parameters may include various information, such as acceptable terminal types, shapes, and sizes, acceptable wire types and sizes, and/or specified crimp heights. Since applicators may be designed to accommodate only a limited number of different terminals and wires, the set-up parameters are specific to the applicator 102. The set-up parameters allow an operator to verify that the applicator 102 is a correct applicator to produce the desired leads. The parameters also allow an operator to manually adjust the termination machine 101 to accurately receive the applicator 102 and accurately operate with the applicator 102. The crimp stroke count, as described above, may represent a number of crimp strokes of the ram 144 (shown in FIG. 1). The crimp stroke count stored within the storage system 204 may be updated periodically, such as during each crimp stroke.

The maintenance schedule may include information that suggests when one or more tooling components of the applicator 102 should be replaced or repaired. For example, the crimp tooling 108 (shown in FIG. 1) may have a suggested lifetime of 10,000 crimping operations before the wear of the crimp tooling 108 may negatively affect the crimp quality of the produced leads, such as by not producing a tight connection between the terminal 110 and the wire 112 (both shown in FIG. 1) that meets crimp specifications. The maintenance schedule may include a maintenance target for the crimp tooling 108, as well as other components of the applicator 102, such as the anvil 118 (FIG. 1), ram 144 (FIG. 1), or even the applicator 102 as a whole. The maintenance target may be a number of crimp strokes or a time when the corresponding component should undergo maintenance, such as by replacing the component or servicing the component. For example, upon replacing crimp tooling 108, the maintenance target may be set to 10,000 crimp strokes. Optionally, the crimp stroke count may be reset when the crimp tooling 108 is replaced or the current count at the time of replacement may be marked to determine when the maintenance target is approaching and is reached. The maintenance schedule and maintenance targets for the various components may differ for the different components. For example, the crimp tooling 108 and the anvil 118 may have shorter maintenance targets, requiring maintenance more often, than the ram 144, because the crimp tooling 108 and the anvil 118 physically engage the terminals 110 during the crimping operations, and thus are exposed to more wear than the ram 144.

The microcontroller 202 may control storage of and/or access to the data related to the applicator 102 (shown in FIGS. 1 and 2) in the storage system 204. For example, the microcontroller 202 may include a microprocessor, or equivalent control circuitry, designed for controlling storage and retrieval of data from the storage system 204. The microcontroller 202 may further include an internal memory, such as RAM or ROM memory, logic and timing circuitry, state machine circuitry, and I/O circuitry. The microcontroller 202 may be capable of receiving, processing and/or managing input signals (for example, data relating to the applicator 102 and commands from the external device 126) as controlled by program code stored in the internal memory and/or the storage system 204. In an embodiment, the microcontroller 202 may be a low power microcontroller unit. The details of the design and operation of the microcontroller 202 are not critical to the inventive subject matter. Any suitable microcontroller 202 may be used that carries out the functions described herein.

The wireless communication system 206 may be configured to wirelessly communicate data relating to the applicator (shown in FIGS. 1 and 2) with a communicatively linked device, such as the external device 126 and the termination machine 101. For example, the wireless communication system 206 may transmit an applicator identifier, set-up parameters including acceptable terminal types, wire types, and crimp heights, a crimp stroke count, a maintenance schedule, and the like. The wireless communication system 206 may be a transmitter-receiver that uses separate circuitry for the transmitting and receiving functions, or, alternatively, a transceiver that uses common circuitry and/or a single housing. The wireless communication system 206 may be configured to transmit and receive electromagnetic radiation signals in the radio frequency (RF) range. The wireless communication system 206 may be configured to communicate with the external device 126 and the termination machine 101 by establishing wireless communication links. The wireless communication links may use any standard wireless protocol, such as Bluetooth®, Bluetooth® low energy, wireless USB, Wi-Fi, and the like. In an embodiment, the wireless communication system 206 may establish a communication link according to a protocol that utilizes a dedicated advertisement channel, as described below with reference to FIG. 4. Protocol firmware may be stored in the storage system 204 and/or in an internal memory of the microcontroller 202. The protocol firmware provides the wireless protocol syntax for the microcontroller 202 to assembly data packets, establish communication links, and partition data received from the external device 126 and/or the termination machine 101.

The established communication link may be bi-directional, such that the communication device 103 may transmit data relating to the applicator 102 to the external device 126 and/or the termination machine 101, and the communication device 103 may also receive messages from the linked devices. For example, the communication device 103 may receive a command from the external device 126 to reset a crimp stroke count, modify at least one of the set-up parameters, update the maintenance schedule, and the like. In response to receiving such a command, the microcontroller 202 may perform the requested operations. For example, the microcontroller 202 may modify the requested set-up parameters by recording the new parameters in the storage system 204, reset the crimp stroke count, or update the maintenance schedule stored in the storage system 204. The microcontroller 202 may also controls the information transmitted to the external device 126 and/or termination machine 101 by the wireless communication system 206.

The battery 208 provides an electrical current to power the communication device 103. The battery 208 may be a lithium-ion battery or the like. In an exemplary embodiment, the battery 208 is rechargeable. The charging system 210 of the communication device 103 is configured to generate an electrical current to charge the battery 208. The charging system 210 may generate the electrical current to charge the battery 208 based on movement of the applicator 102 (shown in FIGS. 1 and 2). Without the charging system 210, the charge life of the battery 208 may be less than one full year, at which time the communication device 103 requires maintenance to add a new battery. However, the charging system 210 provides energy to re-charge the battery 208 that is harvested from the applicator 102, which extends the battery life indefinitely, and reduces any productivity loss or information loss due to the device 103 running out of power. In an embodiment, the charging system 210 may generate an electrical current based on movement of one or more moving components of the applicator 102 by electrical induction. For example, as shown and described further with reference to FIG. 6, one or more magnets may be mounted to the frame 124 (shown in FIG. 1) or the ram 144 (FIG. 1) such that movement of the ram 144 relative to the frame 124 alters the magnetic field around the magnets and generates an electrical current in a proximate coiled wire by electrical induction. In another embodiment, the charging system 210 may generate an electrical current based on vibration or sound caused by movement of the applicator 102. For example, as shown and described further with reference to FIG. 7, the charging system 210 may include one or more piezoelectric elements that are configured to generate an electrical current to charge the battery 208 based on vibration or noise of the applicator 102. Optionally, the piezoelectric element(s) may be positioned to contact the ram 144 or another moving component of the applicator 102, and the force or pressure applied to the piezoelectric element(s) may be used to generate the electrical current to charge the battery 208.

The sensor 212 may be configured to monitor movement of the applicator 102 (shown in FIGS. 1 and 2). For example, the sensor 212 may monitor movement of the ram 144 (shown in FIG. 1) along the crimp stroke. The sensor 212 may be an optical sensor, an ultrasound sensor, a magnetic sensor, or the like. For example, the sensor 212 may be a magnetic sensor with a mechanically operated reed switch. The ram 144 may have one or more magnets installed thereon, and as the one or more magnets move past the sensor 212, the magnet(s) may magnetically pull the reed switch open or shut, depending on the direction of movement of the ram 144. Actuating the reed switch, or triggering the sensor 212 optically or ultrasonically in other embodiments, may cause the sensor 212 to send a signal to the microcontroller 202. The microcontroller 202 may interpret the received signal from the sensor 212 and update the crimp stroke count based on the signal. For example, the microcontroller 202 may enhance the crimp stroke count by one integer or value in response to receiving each signal from the sensor 212. The microcontroller 202 may record the updated crimp stroke count in the storage system 204, such as by writing over the previously recorded crimp stroke count. This function or subsystem of the microcontroller 202 may be referred to as a crimp stroke counter. In addition, the microcontroller 202 optionally may transmit the updated crimp stroke count to the external device 126 and/or the termination machine 101 via the wireless communication system 206. In an embodiment, the microcontroller 202 may be configured to compare the crimp stroke count to one or more maintenance targets in the maintenance schedule to determine whether the crimp stroke count exceeds the one or more maintenance targets. For example, the crimp tooling 108 (shown in FIG. 1) may have a maintenance target of 10,000 crimp strokes, and the microcontroller 202 may compare the current crimp stroke count to the maintenance target of the crimp tooling 108 and/or other maintenance targets of other components of the applicator 102. For example, if the crimp stroke count is 900, the microcontroller 202 calculates that the maintenance target for the crimp tooling 108 is approaching in 100 more crimp strokes. The microcontroller 202, in an embodiment, may control the wireless communication system 206 to communicate an alert to the external device 126 and/or the termination machine 101 when the crimp stroke count exceeds or is at least proximate to a maintenance target. The alert may be visual, audial, or both. Therefore, the operator may be notified that maintenance is required or is soon-to-be required.

Figure 4:
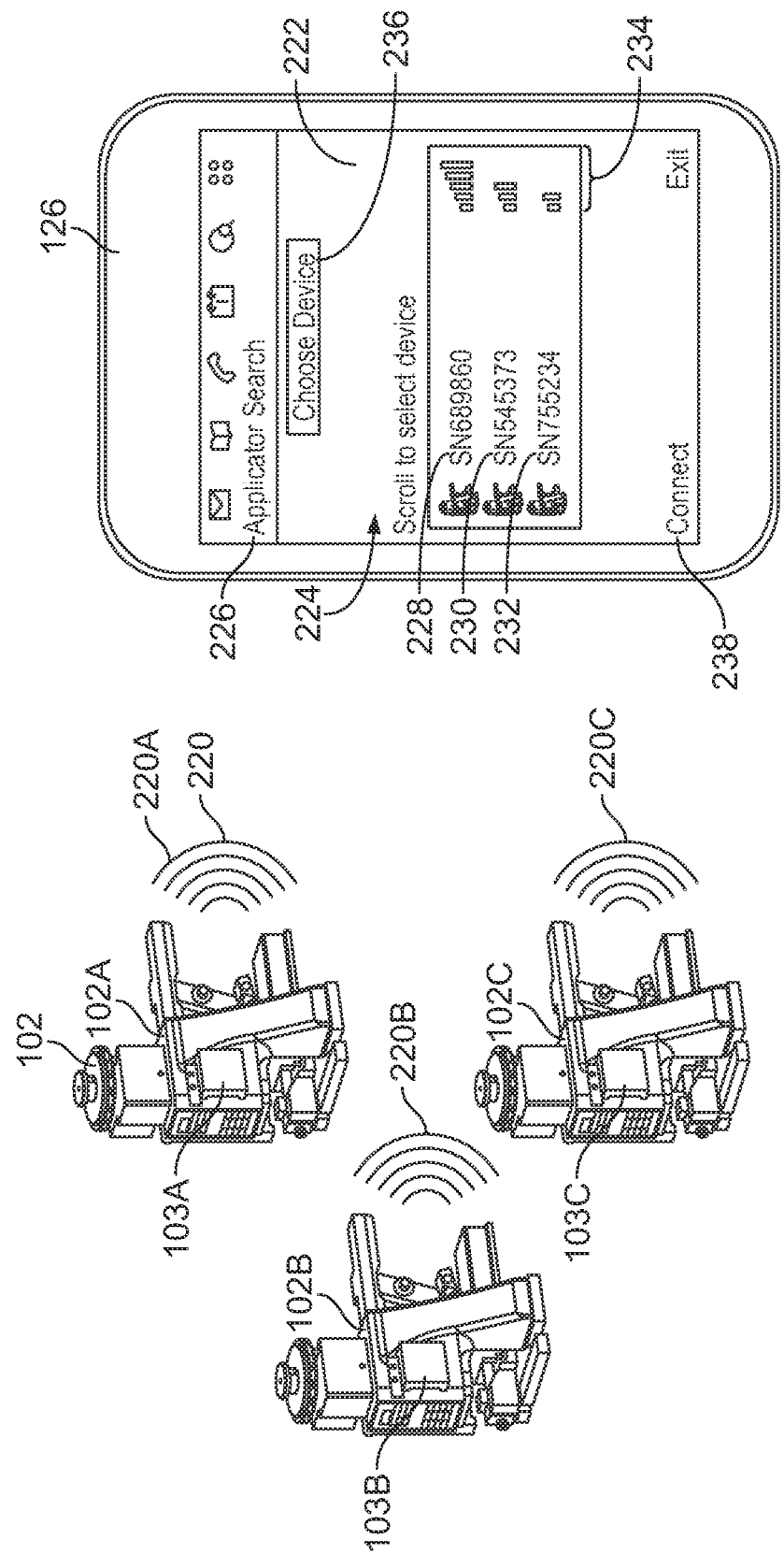
FIG. 4 illustrates an external device poised to establish a communication link with one of three communication devices according to an exemplary embodiment.

FIG. 4 illustrates the external device 126 poised to establish a communication link with one of three communication devices 103A, 103B, 103C. The three communication devices 103A, 103B, 103C are mounted on applicators 102A, 102B, 102C, respectively. The applicators 102A-C may be different types of applicators that are designed to accommodate different terminals (shown in FIG. 1) and wires 112 (FIG. 1). The communication devices 103A-C may include data relating to the specific applicator 102A-C on which each device 103A-C is mounted. An operator using the external device 126 may desire to establish a communication link with a specific one of the applicators 102A-C, or, alternatively, each of the applicators 102A-C one at a time to check on the status of each applicator for maintenance purposes, for example.

In order to establish a communication link, such as the communication link 158 between one of the communication devices 103A-C and the external device 126, the microcontroller 202 (shown in FIG. 3) of each communication device 103A-C instructs the wireless communication system 206 (shown in FIG. 3) to transmit an advertisement notice 220A-C, respectively, on an advertisement channel. The advertisement notices 220A-C may be different for each communication device 103A-C. The advertisement channel may be a point to multipoint, unidirectional, channel. The advertisement channel may carry a repeating pattern of system information messages. The system information messages may describe the identity, configuration, and/or other features of the respective applicator 102A-C. The advertisement channel may represent a predetermined bandwidth within an operating frequency range of the protocol. In an embodiment, the wireless communication system 206 periodically transmits the advertisement notices 220 over the advertisement channel according to the protocol, and the communication link is established with the external device 126 when the external device 126 scans the advertisement channel in search of the advertisement notices 220, detects one of the advertisement notices 220, and responds according to the advertisement notice 220.

In an embodiment, the external device 126 and the communication devices 103A-C may utilize the Bluetooth® low energy (BLE) protocol. The BLE protocol operates within a frequency range of 2400-2483.5 MHz (including guard bands). The operational frequency range is divided into 40 RF channels having a 2 MHz bandwidth. Three RF channels are dedicated advertisement channels having center frequencies at 2402 MHz, 2426 MHz, and 2480 MHz. The remaining RF channels are dedicated data channels. Data channels are utilized by devices having an established BLE communication link to exchange data. For example, when the external device 126 has an established communication link with the communication device 103A, data may be exchanged between the external device 126 and the communication device 103A over one of the data channels. Another communication device 103, such as devices 103B or 103C, without an established communication link, may broadcast connection/address information along the advertisement channel, for instance at 2404 MHz. In other embodiments, the external device 126 and the communication devices 103A-C may establish a communication link according to a different protocol.

The communication devices 103A-C, prior to establishing a communication link, may each transmit one or more advertisement notices 220A-C over the dedicated advertisement channels during an interval. The advertisement notice 220 may be a data packet or a pulse configured to elicit a response from another device to establish a communication link. The advertisement notice 220 may contain frequency synchronization information utilized to form the communication link, address information of the communication device 103, address information of the external device 126, and/or the like. The advertisement notice may be repeated over a set or variable interval, until the communication link is established.

The external device 126 may be prompted by the operator or other user to search for communication devices 103A-C with which to establish a communication link. In response, the external device 126 scans the advertisement channel(s) during select intervals in search of one or more advertisement notices 220A-C. The external device 126 may monitor or scan the advertisement channel(s) for the advertisement notices 220A-C using the wireless communication system 152 (shown in FIG. 2). When the external device 126 receives or detects an advertisement notice 220, the notice 220 may be compared or analyzed to verify the validity of the advertisement notice 220 using the wireless protocol of the external device 126. The advertisement notice 220 may contain specifications for the frequency and/or timing for a data channel to exchange data with the external device 126. Upon verifying the advertisement notice 220, the external device 126 may transmit an acknowledgement on the data channel specified in the advertisement notice 220, or optionally may send specifications for a new data channel over which to communicate. Once the external device 126 and the communication device 103 determine a data channel over which to communicate, the communication link is established.

As shown in FIG. 4, each of the three communication devices 103A-C may periodically send respective advertisement notices 220A-C. The external device 126 includes a display 222 onto which a graphical user interface 224 may be displayed. The graphical user interface 224 indicates the presence of an "Applicator Search" 226. As such, the external device 126 may be currently or recently scanning the advertisement channels in search of one or more detected advertisement notices 220. Three applicators have been detected, according to the graphical user interface 224, and the applicators are identified by serial numbers "SN 689860" 228, "SN 545373" 230, and "SN 755234" 232. For illustrative purposes only, the applicator 102A may have serial number "689860", the applicator 102B may have serial number "545373", and the applicator 102C may have serial number "755234". The vertical bars 234 disposed to the right of the serial numbers in the display 222 may indicate the detected communication signal strength. As shown, the applicator 102A, with serial number 689860, has the strongest signal strength because more bars 234 are associated with the 689860 applicator than the other two applicators. The graphical user interface 224 also includes a prompt for the user to "Choose Device" 236, meaning to select one of the applicators indicated on the display 222 to connect with. The graphical user interface 224 may allow a user to select one of the applicators, such as by providing a touch input on one of the applicator indicators 228, 230, or 232, and a "Connect" button 238 may allow the user to prompt the external device 126 to proceed with establishing a communication link with the selected applicator.

Since the communication devices 103A-C are able to communicate wirelessly with external devices, a single external device 126 accessed by an operator may be capable of quickly and efficiently establishing communication links with each communication device 103A-C without having to first couple each applicator 102A-C to a termination machine.

Figure 5:
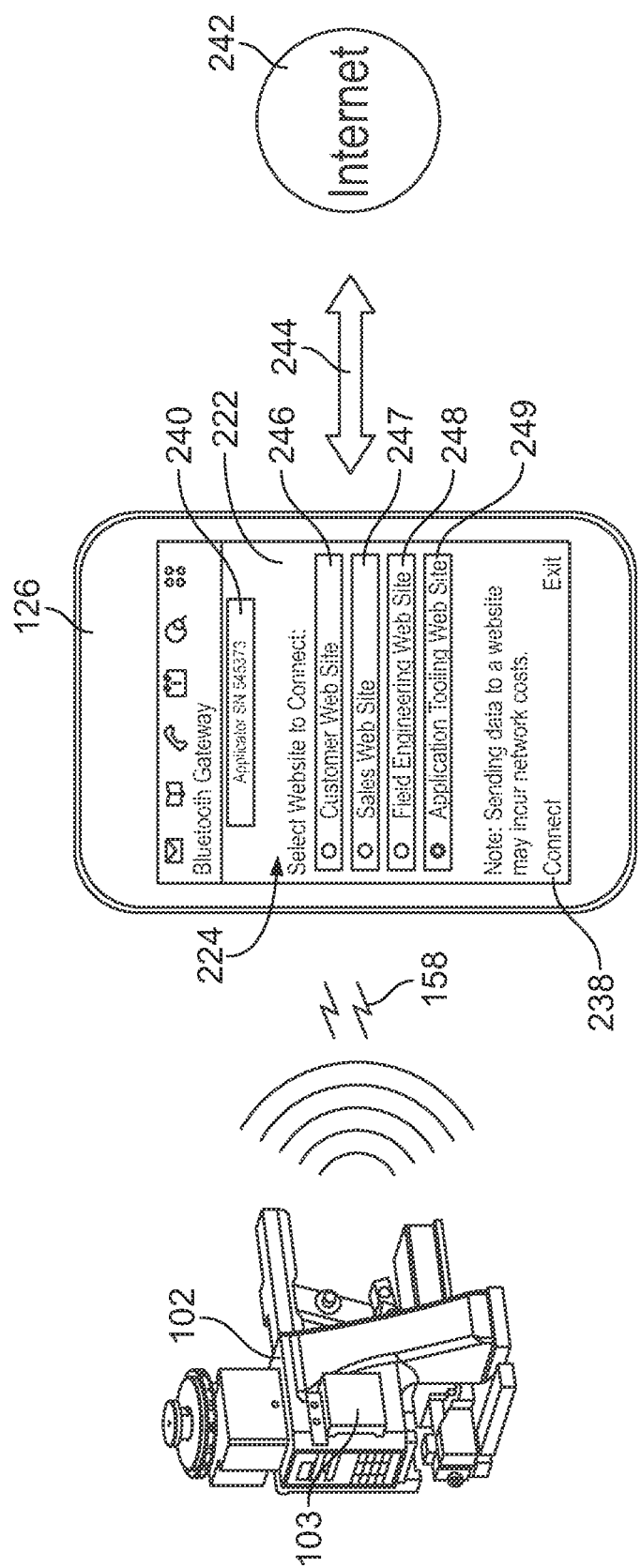
FIG. 5 illustrates an external device after establishing a communication link with a communication device according to an exemplary embodiment.

FIG. 5 illustrates the external device 126 after establishing a communication link 158 with the communication device 103 on an applicator 102. The graphical user interface 224 on the display 222 of the external device 126 indicates that the applicator 102 is identified as "Applicator SN 545373" 240. As such, the external device 126 may have established the communication link 158 with the applicator 102B shown in FIG. 4, which was designated as the applicator with "SN 545373" 230.

Once the communication link 158 is established data may be transferred bi-directionally between the external device 126 and the communication device 103. For example, the communication device 103 may use the communication link 158 to transmit data relating to the applicator 102, such as identification information, set-up parameters, crimp stroke counts, maintenance statuses and schedules, and the like. In an embodiment, the external device 126 may be configured to connect to the Internet 242, such as through a wired or wireless network 244. In other embodiments, the external device 126 may be connected to a closed circuit local network instead of the Internet. The network 244 may be a Wi-Fi network, a wireless local area network (WLAN), or the like. Since the external device 126 is connected via the network 244 to the Internet 242, the external device 126 may configured to upload the data relating to the applicator 102 that is received from the communication device 103 to one or more websites. For example, as shown in FIG. 5, the graphical user interface 224 may provide options for the operator to connect with a "Customer Web Site" 246 or various manufacturer websites, such as a "Sales Web Site" 247, a "Field Engineering Web Site" 248, or an "Application Tooling Web Site" 249. Information relating to the applicator 102 may be sent to one or more websites in order to track use of the applicator 102, report applicator status to the manufacturer (such as for maintenance purposes), store information online for easier accessibility, and the like. As shown in FIG. 5, the "Application Tooling Web Site" 249 indicator is selected. Upon confirming the selection by selecting the "Connect" button 238, at least some information received from the communication device 103 may be forwarded to the website for Application Tooling. Therefore, the information received from the communication device 103 is not limited to being accessed only by an operator or user that is present with the external device 126.

Although FIGS. 4 and 5 show and describe the communication link 158 between the external device 126 and the communication device 103, it is recognized that the communication device 103 may establish a similar communication link with the termination machine 101 (shown in FIGS. 1 and 2).

Figure 6:
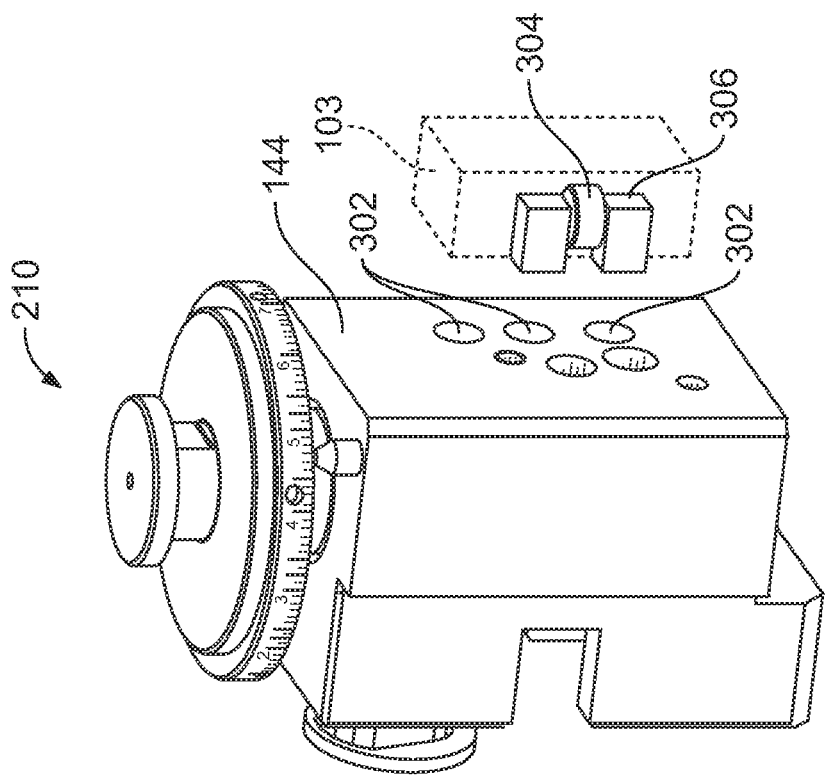
FIG. 6 illustrates an exemplary embodiment of a charging system of a communication device.

FIG. 6 illustrates an exemplary embodiment of the charging system 210 of the communication device 103. The charging system 210 includes one or more magnets 302 mounted on the ram 144 of the applicator 102 (shown in FIG. 1). The charging system 210 further includes a coil of wire 304 wrapped around a metal bar 306. The coil of wire 304 may be at least partially within the communication device 103, which is shown in phantom in FIG. 6. The frame 124 (shown in FIG. 1) of the applicator 102, onto which the communication device 103 may be mounted, is not shown in FIG. 6 for illustrative purposes. According to an exemplary embodiment, as the ram 144 moves relative to the communication device 103, the magnets 302 move relative to the coil 304. The moving magnets 302 may alter the magnetic field around the coil 304, which induces an electrical current in the coil of wire 304 by electrical induction. The coil of wire 304 may be electrically connected to the battery 208 (shown in FIG. 3), such that the induced current charges the battery 208. Therefore, the communication device 103 is configured to generate electrical current based on the movement of the applicator 102, and a wired electrical connection to a power supply source is not necessary.

Figure 7:
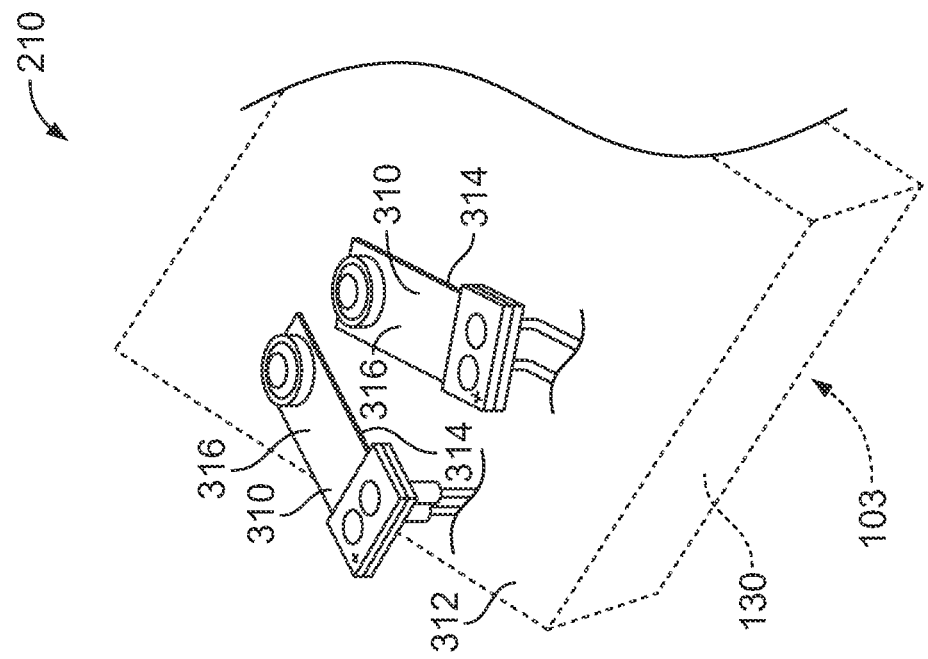
FIG. 7 illustrates another exemplary embodiment of a charging system of a communication device.

FIG. 7 illustrates another exemplary embodiment of the charging system 210 of the communication device 103, which is shown in phantom. The charging system 210 includes one or more piezoelectric elements 310. The piezoelectric elements 310 may be located along an interface surface 312 of the housing 130 of the communication device 103. The interface surface 312 is a surface that contacts the applicator 102 (shown in FIG. 1). Each piezoelectric element 310 includes a metal diaphragm 314 on which a ceramic or crystal layer 316 is mounted. The crystal or ceramic layer 316 may be composed of quartz, for example. As the applicator 102 operates, the applicator 102 may vibrate and/or produce a sound. The vibration and/or noise produced may cause the metal diaphragm 314 to vibrate, and the vibrating diaphragm 314 causes the ceramic or crystal layer 316 to vibrate similarly. Upon vibrating, the ceramic or crystal layer 316 generates an alternating current, which may be picked up by electrodes 318 on the piezoelectric elements 310 and conveyed to the battery 208 (shown in FIG. 3) to charge the battery 208. In another embodiment, the piezoelectric elements 310 may be disposed in the path of the ram 144 along the crimp stroke or another moving component of the applicator 102. As the ram 144 or the other moving component strikes the piezoelectric elements 310, the mechanical stress on the ceramic or crystal layer 316 generates the electrical current that is used to charge the battery 208.

Figure 8:
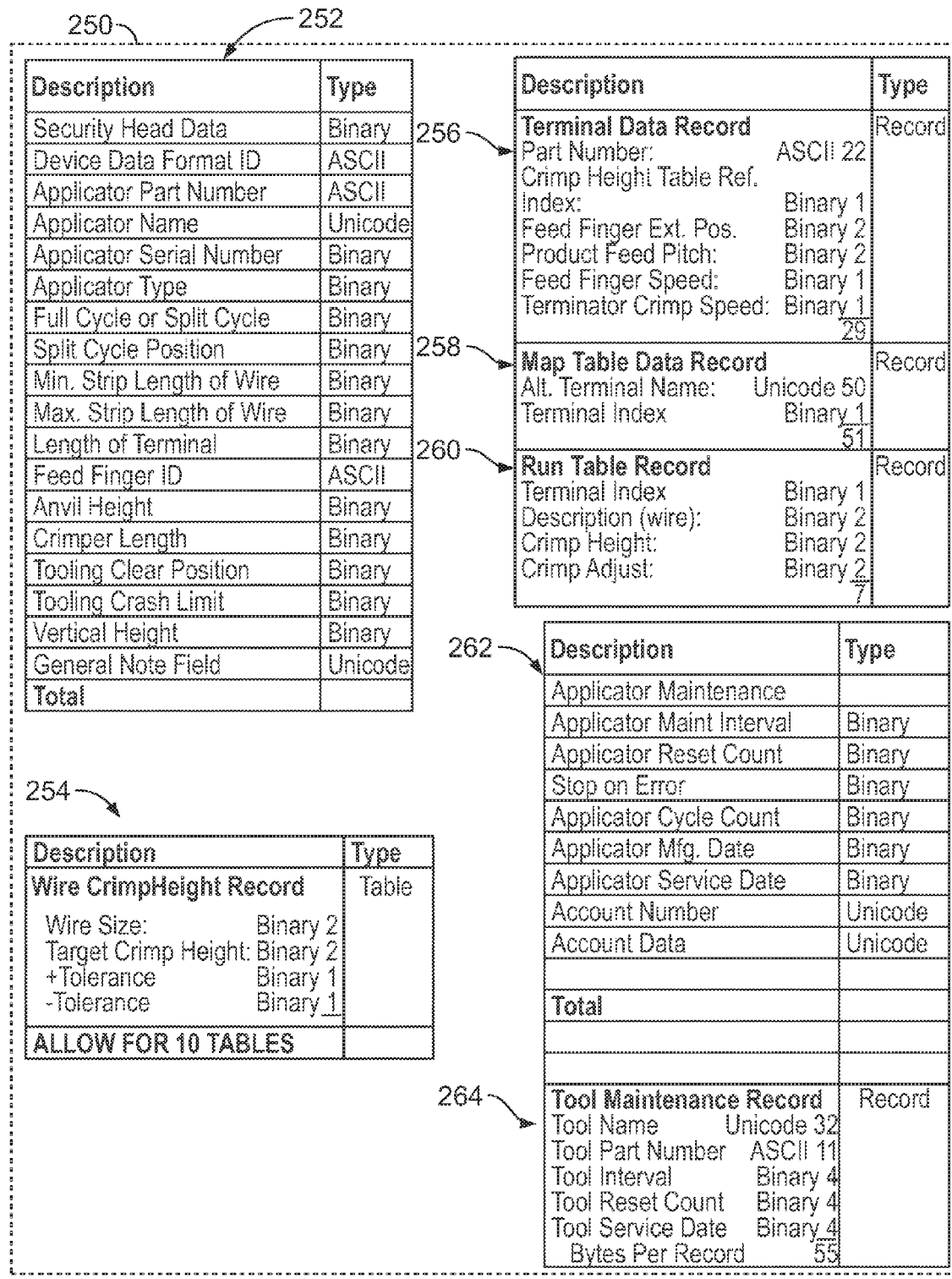
FIG. 8 illustrates a database system for the termination system shown in FIG. 1 according to an exemplary embodiment.

FIG. 8 illustrates an example database system 250 for the termination system 100 (shown in FIG. 1). The database system 250 may be stored within the storage system 204 (shown in FIG. 3) of the communication device 103 (FIG. 3). The database system 250 includes a plurality of sections, each having multiple fields. The sections and fields illustrated in FIG. 8 are exemplary and other data fields may be included in alternative embodiments. Although not shown in FIG. 8, the data fields of the database system 250 in an exemplary embodiment may be populated using the data relating to the applicator 102 (shown in FIG. 1) that is stored in the storage system 204. For example, the data relating to the applicator 102 stored in the storage system 204 of the communication device 103 may include at least the information used to populate the database system 250, if not the database system 250 as well. In an alternative embodiment, the database system 250 may be disposed on the external device 126 (shown in FIG. 1) and/or the termination machine 101 (FIG. 1), and upon establishing a wireless communication link with the communication device 103, the data received from the communication device 103 is used to populate the data fields within the database system 250. The populated database system 250 on the external device 126 and/or termination machine 101 may then be used by the operator during set-up, crimping operations, and/or feeding operations. Alternatively, the termination machine 101 may be configured to automatically adjust parameters based on the populated database system 250.

The database system 250 includes a general field section 252, a wire crimp height record section 254, a terminal data record section 256, a map table data record section 258, a run table record section 260, an applicator maintenance section 262 and a tool maintenance record section 264. Each of the sections may be presented to an operator through a display, such as the display device 128 (shown in FIG. 2) of the termination machine 101 (FIG. 2) or the display system 150 (FIG. 2) of the external device 126 (FIG. 2). The fields may be populated upon receiving the data from the communication device 103 (FIG. 2) with numbers, letters, mathematical functions, operators, and the like.

The general field section 252 includes a plurality of fields that are specific to the applicator 102 (shown in FIG. 1). As such, different applicators may have different data contained within the fields of the general field section 252. For example, the Security Head Data field restricts access to the termination machine 101. The Device Data Format ID field includes information relating to the version number of the communication device 103 (shown in FIG. 1) mounted to the applicator 102. The Applicator Part Number, Name, and Serial Number fields include data unique to the applicator 102. For example, the applicator type relates to the type of applicator, such as side-feed or end-feed. The Full Cycle or Split Cycle field and the Split Cycle Position field are specific fields that relate to the type of terminal being used, such as an open or closed type of terminal. The Minimum and Maximum Strip Length of Wire fields include information relating to an amount of wire exposed when insulation is removed. The Length of Terminal field is a preprogrammed, default value based on the terminal. The Feed Finger ID field is used to identify the feed finger required for the particular applicator 102 and terminal being used for the run. The Anvil Height, Crimper Length, Tooling Clear Position, and Tooling Crash Limit fields include data relating to the crimping process, such as the relative positions of the anvil 118 and crimp tooling 108 (both shown in FIG. 1). The Vertical Height Data field is initially preprogrammed but may be adjusted by the operator over time using the external device 126 (shown in FIG. 1), for example. The General Note Section field may be populated with notes by the operator. The data to populate these fields may be preprogrammed in the communication device 103 and based on the terminals configured to be run by the applicator 102.

The wire crimp height record section 254 includes a Wire Size field, a Target Crimp Height field, a + Tolerance field, and a − Tolerance field. In an embodiment, the operator may select the terminal from a drop down menu from the list of possible terminals, the wire size from a drop down menu from a list of possible wire sizes, and the target crimp height and tolerances may be automatically populated based on default settings relating to the selected terminal. The operator may make selections using the termination machine 101 (shown in FIG. 1) and/or the external device 126 (FIG. 1). The operator may also select a different target crimp height and tolerance field than the default setting. In an embodiment, the operator may modify the default settings using the termination machine 101 and/or the external device 126.

The terminal data record section 256 includes a Part Number field identifying the terminals from a list of preprogrammed possible terminals that the applicator 102 (shown in FIG. 1) accommodates. The database may be updated with new terminals as new terminals are designed to be run in the applicator 102. A Crimp Height Table Ref. Index field is provided to identify the correct crimp height table that relates to the terminal. A Feed Finger Extend Position field and a Product Feed Pitch field are provided to identify an advanced position of the feed guide of the feeder 104 (shown in FIG. 1) and a retracted position, respectively, based on the type of terminal. A Feed Finger Speed field and a Terminator Crimp Speed field are provided and include information relating to a feed speed and a crimp speed, respectively. The feeder 104 may feed the terminals along a different motion profile (e.g. speed, rate, direction) than the termination machine 101 (shown in FIG. 1) drives the applicator 102.

The map table data record section 258 includes an Alternative Terminal Name field which allows the operator to input data relating to an alternative terminal name, such as a customer name used by the operator or a customer to identify the terminal.

The run table record section 260 includes a Terminal Index field which includes data that identifies the terminal for the particular run. A Wire Description field is provided which includes data that identifies the wire size for the particular run. A Crimp Height field is provided which includes data that identifies the target crimp height for the particular run. A Crimp Adjust field identifies a crimp adjust distance that the termination machine 101 (shown in FIG. 1) may use to achieve the target crimp height. The run table record section 260 may be automatically populated for each particular run and stored in the communication device 103 (shown in FIG. 1). In one embodiment, the communication device 103 stores adjustments made during the set-up operation by the operator.

The applicator maintenance section 262 includes an Applicator Maintenance Interval field and an Applicator Reset Count field. The Maintenance Interval field includes data relating to an interval between maintenance, and may be based upon time, use, or some other characteristic. The Maintenance Interval may be populated with a default interval or may be changed by operator input. The Reset Count field includes data relating to the interval, such as the amount of the interval that has been used. A Stop on Error field is also included, which indicates whether the termination machine 101 (shown in FIG. 1) will shut down automatically at the end of an interval. An Applicator Cycle Count field, also referred to herein as a crimp stoke count, includes data relating to a total number of crimp stroke cycles for the applicator 102 (shown in FIG. 1). The cycles may be counted as a total number of cycles, or as a number of cycles from a predetermined start time, such as the beginning of a run, the last reset, the last maintenance, and the like. An Applicator Mfg. Date field includes data relating to the date of manufacture of the applicator 102. An Applicator Service Date field includes data relating to the date of last service. An Account Number field and an Account Data field may identify the account and information relating to the account, such as a particular company division, a particular customer, and the like.

The tool maintenance record section 264 includes information relating to tool maintenance. The tools of the applicator 102 (shown in FIG. 1) may include components such as the ram 144 (FIG. 1), the crimp tooling 108 (FIG. 1), the anvil 118 (FIG. 1), and the like. The tool may also relate to particular maintenance tasks, such as cleaning the applicator 102, lubricating the applicator 102, and the like. A Tool Name field and a Tool Part Number field identify the name and part numbers of the tool, respectively. A Tool Interval field includes data relating to the interval period until the next maintenance is desired. The interval may be based on a time, such as in minutes, hours or days, or may be based on a number of cycles or crimp strokes. The interval may be populated with a default interval or may be changed by operator input. A Tool Reset Count field includes data relating to the interval, such as the amount of the interval that has been used. A Tool Service Date field may be provided including data relating to the date of last service.

Figure 9:
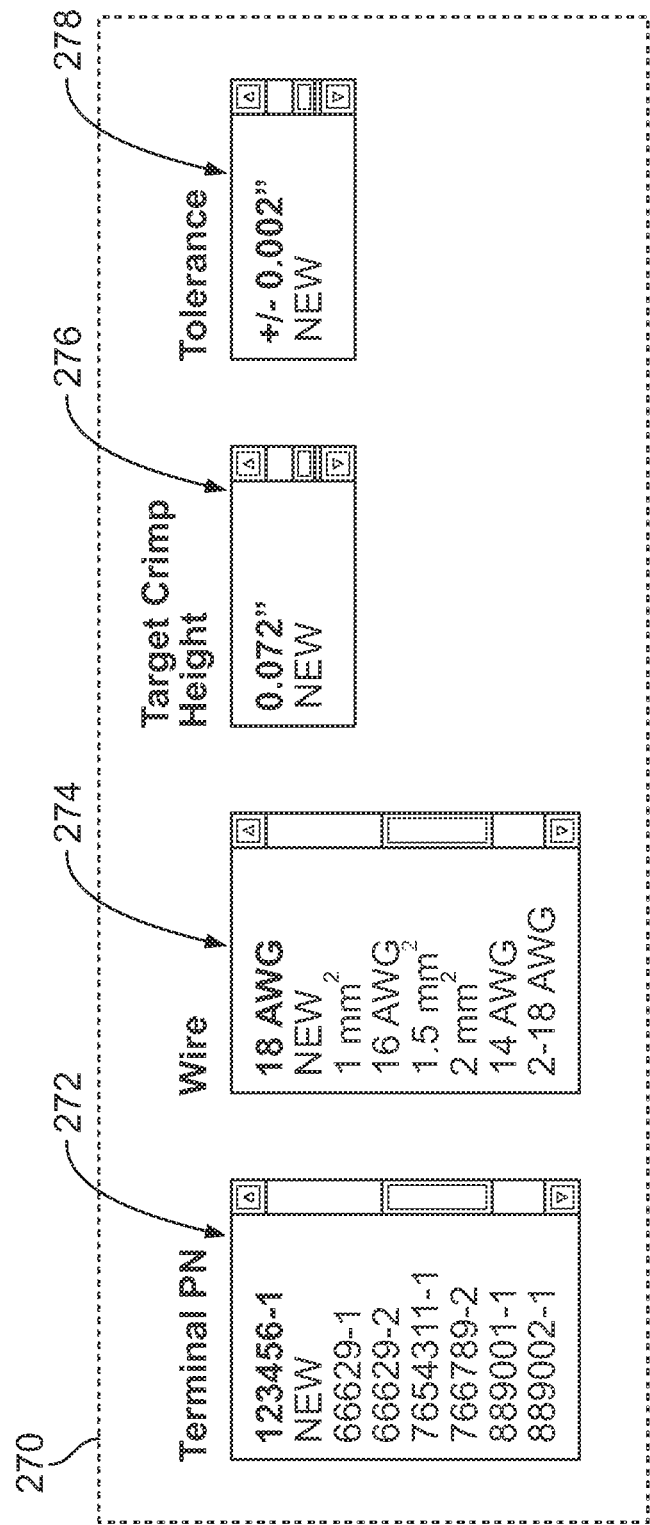
FIG. 9 illustrates an interface for selecting from the database system illustrated in FIG. 8 according to an exemplary embodiment.

FIG. 9 illustrates an exemplary interface 270 for selecting from the database system 250 illustrated in FIG. 8. The interface 270 may include an interface component and display component, such as the interface 154 and display 150 of the external device 126 illustrated in FIG. 2. As such, the operator may view multiple menus and select appropriate values to populate the database system 250. The interface 270 communicates with the communication device 103 (shown in FIG. 2) which stores the database system 250 or at least data used to populate the database system 250. Alternatively, or in addition, the interface 270 may be disposed on the termination machine 101 (shown in FIG. 2) instead of the external device 126.

In operation, the operator selects certain parameters, which are communicated to the termination machine 101 (shown in FIG. 1) to operate the applicator 102 (FIG. 1) and other components of the termination system 100 (FIG. 1). For example, because the termination machine 101 operates differently depending on a terminal type and a wire size, these parameters should be selected from the interface 270 during set-up of the termination machine 101. In an exemplary embodiment, the operator selects the parameters from a list of parameters in drop down menus. In the illustrated embodiment, the interface 270 includes a terminal part number menu 272, a wire selection menu 274, a target crimp height menu 276, and a tolerance menu 278. The operator selects a terminal type from the terminal part number menu 272. The operator selects a wire type from the wire selection menu 274. The operator selects a target crimp height from the target crimp height menu 276. The operator selects a tolerance from the tolerance menu 278. The menus and selections within the menus are exemplary and other menus and selections may be included in alternative embodiments of the interface 270. In an embodiment, the selected parameters may be stored in the communication device 103.

The communication device 103 (shown in FIG. 1) is shown and described herein as being mounted to the applicator 102 (FIG. 1). However, in an alternative embodiment, the communication device 103, or an additional communication device (not shown), may be mounted to another component of the termination system 100 (FIG. 1), such as to the feeder 104. For example, a communication device on the feeder 104 may be configured to record feed strokes, store data relating to the feeder 104, and provide such data to the termination machine 101 (FIG. 1) and/or the external device 126 (FIG. 1) by establishing a wireless communication link.

At least one technical effect of various embodiments of a termination system described herein includes a communication device that stores data relating to an operation of the termination system, where the communication device is not coupled to an applicator or another component of the termination system by a wired connection. As a result, the component on which the communication device is mounted may be easily coupled to and removed from a termination machine, such as when interchanging applicators, without additional external wires to connect and disconnect. Furthermore, the communication device does not have external wires that might interfere with operation of the termination system, such as by blocking a view of a crimping area.

At least one technical effect of various embodiments of a termination system described herein includes a communication device that includes a wireless communication system that is configured to establish a wireless communication link with a linked device in order to transfer data over the communication link. The wireless communication system may be able to communicate according to prevalent, standardized communication protocols, including Bluetooth®, which increases the compatibility of the communication device, allowing the communication device to establish communication links with various different external devices as well as the termination machine of the termination system. At least one technical effect is that an operator may be able to receive information about one or more applicators remotely, such as to check a status of each applicator and determine when maintenance will be required.

At least one technical effect of various embodiments of a termination system described herein includes a communication device that includes a charging system that generates an electric current to charge a battery of the communication device based on movement of the applicator, so an external power source and wired connection thereto is not necessary to power the communication device. As a technical effect, the life of the communication device before maintenance is not limited to a charge life of the battery.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the term "system," "computer," and "controller," may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the terms "system," "computer," or "controller."

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (1), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A termination system comprising:
    an applicator including a ram and an anvil, the anvil located in a crimping zone and configured to receive a terminal thereon, the ram configured to be driven towards and away from the anvil along a crimp stroke, the ram including crimp tooling that is configured to crimp the terminal to a wire as the ram moves towards the anvil; and
    a communication device having a housing that is mounted to the applicator, the communication device comprising:
        a storage system within the housing that stores data relating to the applicator;
        a wireless communication system within the housing that wirelessly transmits the data relating to the applicator to a mobile device via a communication link, the mobile device being held by an operator and comprising one or more of a smartphone or a tablet, the mobile device located remote from the applicator and the communication device and not mechanically connected to the applicator or the communication device, the mobile device including a display that displays at least some of the data relating to the applicator to the operator, the wireless communication system configured to establish the communication link with the mobile device by utilizing advertisement notices transmitted on a dedicated advertisement channel; and
        a microcontroller within the housing that is operatively connected to the storage system and the wireless communication system, the microcontroller controlling access to the data relating to the applicator in the storage system and controlling wireless transmission of the data to the mobile device via the wireless communication system.

2. The system of claim 1, wherein the wireless communication system of the communication device is further configured to wirelessly communicate with a termination machine that drives the ram along the crimp stroke, the microcontroller controlling the wireless communication system to transmit at least one of an applicator identifier, set-up parameters including acceptable terminal types, wire types, and crimp heights, a crimp stroke count, or a maintenance schedule to the termination machine.

3. The system of claim 1, wherein the wireless communication system periodically transmits the advertisement notices over the dedicated advertisement channel, and the communication link is established with the mobile device when the mobile device scans the dedicated advertisement channel in search of the advertisement notices and detects one of the advertisement notices.

4. The system of claim 1, wherein the wireless communication system is configured to establish the communication link with the mobile device according to a Bluetooth® low energy protocol.

5. The system of claim 1, wherein the communication device further comprises a sensor that monitors movement of the ram along the crimp stroke, the microcontroller configured to update a crimp stroke count of the ram in the storage system based on one or more signals received from the sensor and control the wireless communication system to transmit the updated crimp stroke count to the mobile device.

6. The system of claim 5, wherein the data relating to the applicator includes a maintenance schedule for the applicator which includes a maintenance target, the microcontroller configured to compare the crimp stroke count to the maintenance target and control the wireless communication system to transmit an alert to the mobile device responsive to the crimp stroke count exceeding the maintenance target.

7. The system of claim 1, wherein the communication device further comprises:
    a rechargeable battery within the housing that provides an electrical current to power the communication device; and
    a charging system electrically connected to the rechargeable battery that generates an electrical current to charge the rechargeable battery based on movement of the applicator.

8. The system of claim 7, wherein the ram of the applicator is movably mounted to a frame, the charging system of the communication device including one or more magnets mounted to at least one of the frame or the ram such that movement of the ram relative to the frame generates an electrical current to charge the rechargeable battery by electrical induction.

9. The system of claim 7, wherein the charging system of the communication device includes one or more piezoelectric elements that are configured to generate an electrical current to charge the rechargeable battery based on at least one of vibration or noise of the applicator.

10. A termination system comprising:
    an applicator including a ram and an anvil, the anvil located in a crimping zone and configured to receive a terminal thereon, the ram configured to be driven towards and away from the anvil along a crimp stroke, the ram including crimp tooling that is configured to crimp the terminal to a wire as the ram moves towards the anvil; and
    a communication device having a housing that is mounted to the applicator, the communication device comprising:
        a storage system within the housing that stores data relating to the applicator;
        a wireless communication system within the housing that wirelessly transmits the data relating to the applicator to a mobile device held by an operator comprising one or more of a smartphone or a tablet, the mobile device located remote from the applicator and the communication device and not mechanically connected to the applicator or the communication device, the mobile device including a display that displays at least some of the data relating to the applicator to the operator; and a microcontroller within the housing that is operatively connected to the storage system and the wireless communication system, the microcontroller controlling access to the data relating to the applicator in the storage system and controlling wireless transmission of the data to the mobile device via the wireless communication system, wherein the data relating to the applicator that is stored in the storage system and transmitted to the mobile device includes at least one of an applicator identifier, set-up parameters including acceptable terminal types, wire types, and crimp heights, a crimp stroke count, or a maintenance schedule.

11. The system of claim 10, wherein in response to receiving a command from the mobile device, the microcontroller of the communication device at least one of modifies one of the set-up parameters, resets the crimp stroke count, or updates the maintenance schedule.

12. A termination system comprising:

an applicator including a ram and an anvil, the anvil located in a crimping zone and configured to receive a terminal thereon, the ram configured to be driven towards and away from the anvil along a crimp stroke, the ram including crimp tooling that is configured to crimp the terminal to a wire as the ram moves towards the anvil; and a communication device having a housing that is mounted to the applicator, the communication device comprising:

a storage system within the housing that stores data relating to the applicator;

a wireless communication system within the housing that wirelessly communicates the data relating to the applicator with an external device accessed by an operator;

a microcontroller within the housing that is operatively connected to the storage system and the wireless communication system, the microcontroller controlling access to the data relating to the applicator in the storage system and controlling wireless communication of the data relating to the applicator with the external device via the wireless communication system;

a rechargeable battery within the housing that provides an electrical current to power the communication device; and a charging system electrically connected to the rechargeable battery, the charging system configured to generate an electrical current to charge the rechargeable battery based on movement of the applicator.

13. The termination system of claim 12, wherein the ram of the applicator is movably mounted to a frame of the applicator, the charging system of the communication device including one or more magnets mounted to at least one of the frame or the ram such that movement of the ram relative to the frame generates an electrical current to charge the rechargeable battery by electrical induction.

14. The termination system of claim 12, wherein the charging system of the communication device includes one or more piezoelectric elements that are configured to generate an electrical current to charge the rechargeable battery based on at least one of vibration or noise of the applicator.

15. The termination system of claim 12, wherein the wireless communication system communicates with the external device by establishing a communication link according to a protocol that utilizes a dedicated advertisement channel.

16. The termination system of claim 12, wherein the data relating to the applicator that is stored in the storage system and communicated to the external device includes at least one of an applicator identifier, set-up parameters including acceptable terminal types, wire types, and crimp heights, a crimp stroke count, or a maintenance schedule.

17. The termination system of claim 12, wherein, in response to receiving a command from the external device via the wireless communication system, the microcontroller one or more of modifies one of the set-up parameters, resets the crimp stroke count, or updates the maintenance schedule.

18. The termination system of claim 12, further comprising a sensor that monitors movement of the ram along the crimp stroke, the sensor electrically connected to and powered by the rechargeable battery, the sensor transmitting signals to the microcontroller based on the movement of the ram, the microcontroller configured to update the data relating to the applicator that is stored in the storage system in response to receiving the signals from the sensor.

19. The termination system of claim 18, wherein the signals from the sensor represent a number of completed crimp strokes of the ram and the microcontroller updates a crimp stroke count of the ram that is stored in the storage system based on the signals received from the sensor, wherein the microcontroller is configured to control the wireless communication system to wirelessly communicate an alert to the external device in response to the crimp stroke count exceeding a prescribed maintenance target of the ram.

* * * * *